United States Patent
Tsai et al.

(10) Patent No.: US 8,023,119 B2
(45) Date of Patent: Sep. 20, 2011

(54) METHOD FOR ANALYZING MUCOSA SAMPLES WITH OPTICAL COHERENCE TOMOGRAPHY

(75) Inventors: Meng-Tsan Tsai, Taipei (TW);
Hsiang-Chieh Lee, Taipei (TW);
Cheng-Kuang Lee, Taipei (TW);
Yih-Ming Wang, Taipei (TW);
Chun-Pin Chiang, Taipei (TW);
Hsin-Ming Chen, Taipei (TW);
Chih-Chung Yang, Taipei (TW)

(73) Assignee: National Taiwan University, Taipei (TW)

( * ) Notice: Subject to any disclaimer, the term of this patent is extended or adjusted under 35 U.S.C. 154(b) by 346 days.

(21) Appl. No.: 12/393,953

(22) Filed: Feb. 26, 2009

(65) Prior Publication Data
US 2010/0103430 A1    Apr. 29, 2010

(30) Foreign Application Priority Data
Oct. 29, 2008    (TW) .............................. 97141557 A

(51) Int. Cl.
*G01B 11/02*    (2006.01)

(52) U.S. Cl. ........ 356/497; 600/476; 600/477; 600/478; 600/479

(58) Field of Classification Search ................... 356/479, 356/497; 600/476–479
See application file for complete search history.

(56) References Cited

U.S. PATENT DOCUMENTS

| 7,865,231 | B2 * | 1/2011 | Tearney et al. | 600/476 |
| 2002/0198457 | A1 * | 12/2002 | Tearney et al. | 600/476 |
| 2003/0103212 | A1 * | 6/2003 | Westphal et al. | 356/479 |

* cited by examiner

*Primary Examiner* — Tarifur Chowdhury
*Assistant Examiner* — Jonathon Cook

(57) ABSTRACT

A method for analyzing mucosa structure with optical coherence tomography (OCT) is provided, and includes: (a) scanning a mucosa sample with optical coherence tomography; (b) choosing a lateral range from a two- or three-dimensional OCT image and analyzing all the A-scan intensity profiles in the lateral range; (c) calculating three indicators in each A-scan intensity profile, including the standard deviation for a certain depth range below the sample surface, the exponential decay constant of the spatial-frequency spectrum and the epithelium thickness under the condition that the basement membrane is identifiable; and (d) using the three indicators of each A-scan intensity profile within the lateral range to analyze the mucosa structure.

4 Claims, 14 Drawing Sheets

METHOD FOR ANALYZING MUCOSA SAMPLES WITH OPTICAL COHERENCE TOMOGRAPHY

CROSS REFERENCE TO RELATED APPLICATIONS

This Application claims priority of Taiwan Patent Application No. 097141557, filed on Oct. 29, 2008, the entirety of which is incorporated by reference herein.

BACKGROUND OF THE INVENTION

1. Field of the Invention

The present invention relates to a method for analyzing structures of mucosa samples, and in particular relates to a method for analyzing the mucosa samples with optical coherence tomography.

2. Description of the Related Art

The majority of oral cancers are found to develop from oral premalignant lesions such as leukoplakia, erythroplakia, erythroleukoplakia, dysplasia, and carcinoma in situ. Due to the high malignant transformation rates for oral premalignant lesions, early diagnosis and early treatment are important. In order for a correct pathological diagnosis, a suspicious oral lesion may need multiple biopsies to avoid misdiagnosis of the most severe part of the lesion. For reducing a patients' pain and suffering from multiple biopsies, one of the best non-invasive technique to select the most appropriate sites for biopsy is to use optical coherence tomography (OCT) imaging to detect oral precancers and cancers.

Although the time-domain configuration of OCT has been applied in a variety of medical and biological applications, such a configuration has several restrictions, including limited imaging speed. Recently, OCT systems based on Fourier-domain detection have been widely implemented to speed up imaging speed. OCT systems based on Fourier-domain detection may include two techniques, either the spectral-domain OCT (SD-OCT) or the swept-source OCT (SS-OCT), wherein both of them obtain the depth structure information of a detected object by spectrally resolving the interference signal. A Fourier-domain OCT system has the advantages of higher imaging sensitivity and faster imaging speed when compared with a time-domain system. In the SD-OCT technique, normally a detector array, such as a charge-coupled device (CCD), is needed. However, slow development of CCDs has limited the application of the SD-OCT technique. On the other hand, the rapid development of the sweeping-frequency laser has led to a spectral coverage of the SS-OCT technique covering the entire biological window, from 1300 nm through 1050 nm to 850 nm. Nowadays, SS-OCT systems are widely used for various biomedical applications.

BRIEF SUMMARY OF THE INVENTION

The invention refers to three indicators for analyzing the mucosa samples.

The invention provides a method for analyzing the mucosa samples with optical coherence tomography, comprising: (a) scanning a mucosa sample with optical coherence tomography; (b) selecting a specific lateral range from a two- or three-dimensional optical coherence tomography image and analyzing all A-scan intensity signal profiles within the specific lateral range, wherein the analyzing method comprises: i. calculating a standard deviation (SD) for each of the A-scan intensity signal profiles in a specific depth range under a surface of the mucosa sample within the specific lateral range; ii. Fourier transforming all A-scan intensity signals in each of the A-scan intensity signal profiles and then exponential decay fitting a result from the Fourier transforming operation to obtain an exponential decay constant ($\alpha$), or then fitting a result from the Fourier transforming operation by a manner presenting a relative intensity of high- and low-spatial frequency components to obtain an exponential decay constant ($\alpha$); and iii. calculating an epithelium thickness (T) of the mucosa sample when a boundary between an epithelium and a lamina propria of the of the mucosa sample exists; and (c) analyzing the mucosa sample with the standard deviation (SD), the exponential decay constant ($\alpha$) and the epithelium thickness (T).

The invention also provides a method for analyzing the mucosa samples with optical coherence tomography, comprising: (a) scanning a mucosa sample with optical coherence tomography; (b) selecting a specific lateral range from a two- or three-dimensional optical coherence tomography image and analyzing all A-scan intensity signal profiles within the specific lateral range; and (c) calculating a standard deviation (SD) for each of the A-scan intensity signal profiles within the specific lateral range, respectively, third-order polynomial fitting all standard deviations (SD) of all the A-scan intensity signal profiles within the specific lateral range to obtain a lateral trend of all standard deviations (SD) of all the A-scan intensity signal profiles within the specific lateral range and then analyzing the mucosa sample with the lateral trend of all standard deviations (SD).

The invention also provides a method for analyzing the mucosa samples with optical coherence tomography, comprising: (a) scanning a mucosa sample with optical coherence tomography; (b) selecting a specific lateral range from a two- or three-dimensional optical coherence tomography image and analyzing all A-scan intensity signal profiles within the specific lateral range; (c) Fourier transforming all A-scan intensity signals in each of the A-scan intensity signal profiles in the specific lateral range and then exponential decay fitting a result from the Fourier transforming operation to obtain an exponential decay constant ($\alpha$), or then fitting a result from the Fourier transforming operation by a manner presenting a relative intensity of high- and low-spatial frequency components to obtain an exponential decay constant ($\alpha$); and (d) third-order polynomial fitting all the exponential decay constant ($\alpha$) of all the A-scan intensity signal profiles within the specific lateral range to obtain a lateral trend of all exponential decay constants ($\alpha$) of all the A-scan intensity signal profiles within the specific lateral range and then analyzing the mucosa sample with the lateral trend of all exponential decay constants ($\alpha$).

The invention also provides a method for analyzing the mucosa samples with optical coherence tomography, comprising: (a) scanning a mucosa sample with optical coherence tomography; (b) selecting a specific lateral range from a two- or three-dimensional optical coherence tomography image and analyzing all A-scan intensity signal profiles in the specific lateral range; (c) calculating an epithelium thicknesses (T) of the mucosa sample for each of A-scan intensity signal profiles within the specific lateral range; and (d) third-order polynomial fitting all the epithelium thicknesses (T) at all the A-scan intensity signal profiles within the specific lateral range to obtain a lateral trend of all the epithelium thicknesses (T) at all the A-scan intensity signal profiles within the specific lateral range and then analyzing the mucosa sample with the lateral trend of all the epithelium thicknesses (T).

The invention further provides method for identifying a normal or abnormal mucosa sample with optical coherence tomography, comprising: (a) providing a normal mucosa sample and a suspected abnormal mucosa sample from an individual; (b) scanning the normal mucosa sample and the suspected abnormal mucosa sample with optical coherence tomography, respectively; (c) according to a two-dimensional optical coherence tomography image, selecting a specific lateral range from a surface of the normal mucosa sample and the suspected abnormal mucosa sample, respectively, wherein the lengths of the specific lateral ranges from the surface of the normal mucosa sample and from the surface of the suspected abnormal mucosa sample are the same; (d) calculating a standard deviation (SD), an exponential decay constants ($\alpha$) and an epithelium thicknesses (T) for each of A-scan intensity signal profiles within the specific lateral range from the surface of the normal mucosa sample and from the surface of the suspected abnormal mucosa sample, respectively; (e) comparing scanned results for the normal mucosa sample and the suspected abnormal mucosa sample, respectively, wherein the standard deviation (SD), the exponential decay constants ($\alpha$) and the epithelium thicknesses (T) of the A-scan intensity signal profile changes with a position of the selected specific lateral range, and then obtaining the means of all the standard deviation (SD), all the exponential decay constants ($\alpha$) and all the epithelium thicknesses (T) within the specific lateral range from the normal mucosa sample and from the suspected abnormal mucosa sample, respectively; (f) comparing the means of all the standard deviation (SD), all the exponential decay constants ($\alpha$) and all the epithelium thicknesses (T) within the specific lateral range from the normal mucosa sample and from the suspected abnormal mucosa sample, respectively; and (g) the suspected abnormal mucosa sample being an abnormal sample when the mean of all the standard deviations (SD) of the suspected abnormal mucosa sample is greater then the normal mucosa sample, the suspected abnormal mucosa sample being an abnormal sample when the mean of all the exponential decay constants ($\alpha$) of the suspected abnormal mucosa sample is less then the normal mucosa sample, and the suspected abnormal mucosa sample being an abnormal sample when the mean of all the epithelium thicknesses (T) of the suspected abnormal mucosa sample is greater then the normal mucosa sample under the condition that a boundary between an epithelium and a lamina propria of the of the mucosa sample exists.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
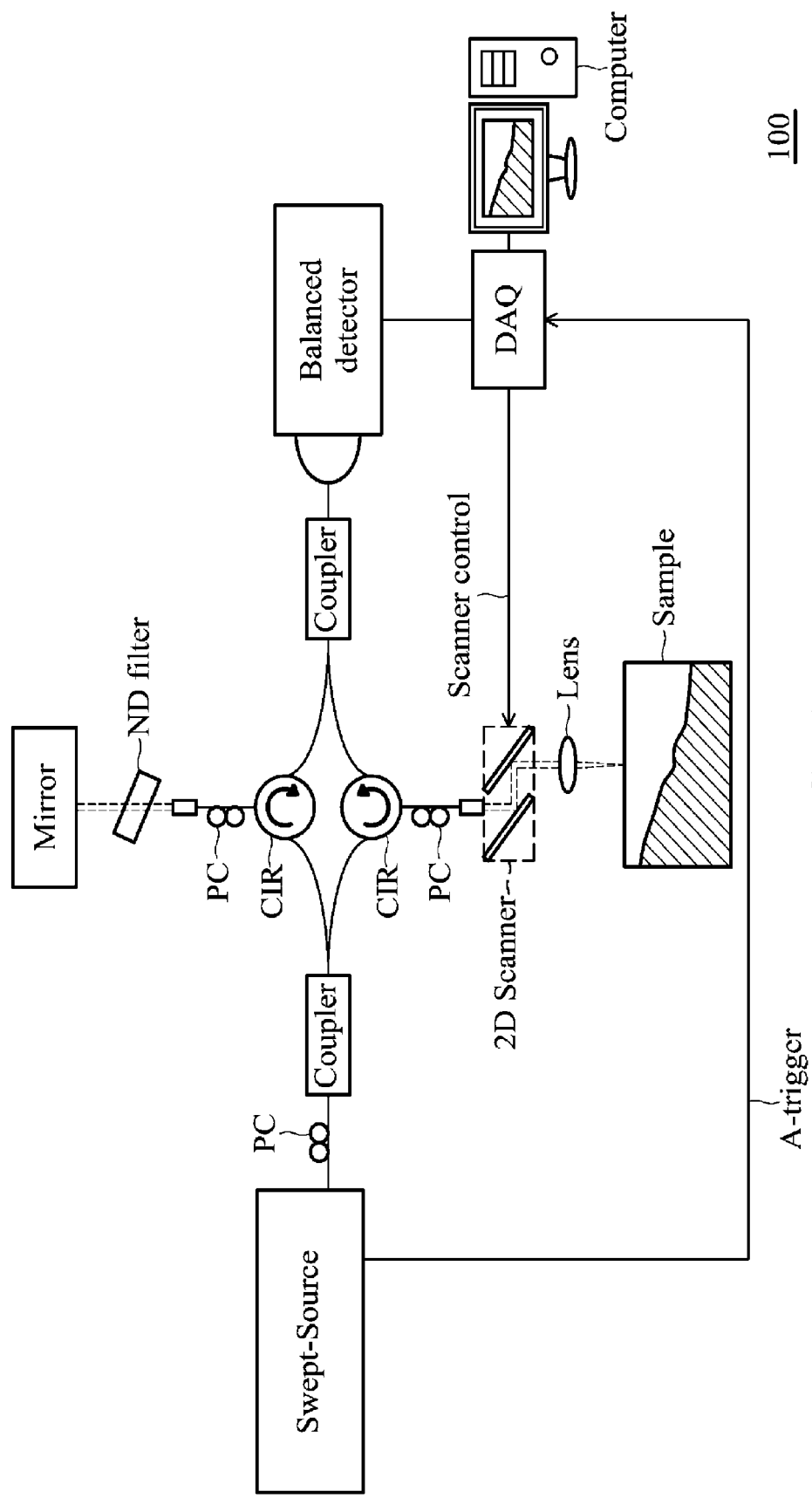
FIG. 1 shows a layout of a portable SS-OCT system used for clinical scanning.

The following description is of the best-contemplated mode of carrying out the invention. This description is made for the purpose of illustrating the general principles of the invention and should not be taken in a limiting sense. The scope of the invention is best determined by reference to the appended claims.

In the invention, mucosa samples are analyzed with optical coherence tomography.

In one embodiment, first, a mucosa sample is scanned with optical coherence tomography. The optical coherence tomography may comprise time domain optical coherence tomography, spectral-domain optical coherence tomography or swept-source optical coherence tomography. In one embodiment, the mucosa sample may comprise an oral mucosa sample. Then, a specific lateral range from a two- or three-dimensional optical coherence tomography image is selected, wherein the specific lateral range may be about 0.001-100 mm. In one embodiment, the specific lateral range is about 2 mm.

Analyzing the mucosa sample with optical coherence tomography comprises calculating a standard deviation (SD), an exponential decay constant ($\alpha$), and an epithelium thickness for each of the A-scan intensity signal profiles in a specific depth range under a surface of the mucosa sample within the specific lateral range. The specific depth range may be about 0.001-100 mm.

Method 1: A standard deviation (SD) for each of the A-scan intensity signal profiles in the specific depth range under a surface of the mucosa sample within the specific lateral range is calculated. In one embodiment, a specific depth is at the position about 100 µm to 250 µm under the surface of the mucosa sample. Therefore, the specific depth range is totally 150 µm. Method 2: all A-scan intensity signals in each of the A-scan intensity signal profiles are Fourier transformed and then a result from the Fourier transforming operation is exponential decay fitted to obtain an exponential decay constant ($\alpha$), or then a result from the Fourier transforming operation is fitted by a manner presenting a relative intensity of high- and low-spatial frequency components to obtain an exponential decay constant ($\alpha$). In one embodiment, a specific depth which is calculated is at the position about 3 mm under the surface of the mucosa sample. Therefore, the specific depth range is totally 3 mm. Method 3: According to each A-scan intensity signal within an A-scan intensity signal profile, an epithelium thicknesses (T) of the mucosa sample at each of A-scan intensity signal profile is calculated when a boundary between an epithelium and a lamina propria of the mucosa sample exists. In one embodiment, a specific depth is calculated at the position about 3 mm under the surface of the mucosa sample. Therefore, the specific depth range is totally 3 mm.

A program may be used to calculate the epithelium thicknesses (T). In one embodiment, the program may comprise LabVIEW (Nation Instrument). According to a single A-scan intensity signal profile, a first maximum A-scan intensity signal and a second maximum A-scan intensity signal may be obtained by the program calculations. The first maximum refers to the boundary between the air and the epithelium and the second maximum refers to the boundary between the epithelium and the lamina propria. By calculating the two maximums, the epithelium thicknesses (T) may be obtained.

Finally, the mucosa sample is analyzed by analyzing the standard deviation (SD), the exponential decay constant ($\alpha$) and the epithelium thicknesses (T).

In another embodiment, first, a mucosa sample is scanned with optical coherence tomography. The optical coherence tomography may comprise time domain optical coherence tomography, spectral-domain optical coherence tomography or swept-source optical coherence tomography. In one embodiment, the mucosa sample may comprise an oral mucosa sample.

Then, a specific lateral range from a two- or three-dimensional optical coherence tomography image is selected and all A-scan intensity signal profiles within the specific lateral range are analyzed. The specific lateral range may be about 0.001-100 mm. In one embodiment, the specific lateral range is about 2 mm. Finally, a standard deviation (SD) for each of the A-scan intensity signal profiles within the specific lateral range is calculated, respectively, and all standard deviations (SD) of all the A-scan intensity signal profiles within the specific lateral range are third-order polynomial fitted to obtain a lateral trend of all standard deviations (SD) of all the A-scan intensity signal profiles within the specific lateral range and the mucosa sample is analyzed with the lateral trend of all standard deviations (SD). The greater the lateral trend of all standard deviations (SD) tend to be, the more abnormal the mucosa sample is.

Moreover, in another embodiment, first, a mucosa sample is scanned with optical coherence tomography. The optical coherence tomography may comprise time domain optical coherence tomography, spectral-domain optical coherence tomography or swept-source optical coherence tomography. In one embodiment, the mucosa sample may comprise an oral mucosa sample.

Then, a specific lateral range from a two- or three-dimensional optical coherence tomography image is selected and all A-scan intensity signal profiles within the specific lateral range are analyzed. The specific lateral range may be about 0.001-100 mm. In one embodiment, the specific lateral range is about 2 mm.

Next, all A-scan intensity signals in each of the A-scan intensity signal profiles in the specific lateral range are Fourier transformed and then a result from the Fourier transforming operation is exponential decay fitted to obtain an exponential decay constant ($\alpha$), or then a result from the Fourier transforming operation is fitted by a manner presenting a relative intensity of high- and low-spatial frequency components to obtain an exponential decay constant ($\alpha$).

Finally, all the exponential decay constant ($\alpha$) of all the A-scan intensity signal profiles within the specific lateral range are third-order polynomial fitted to obtain a lateral trend of all exponential decay constants ($\alpha$) of all the A-scan intensity signal profiles within the specific lateral range and the mucosa sample is analyzed with the lateral trend of all exponential decay constants ($\alpha$). The more decreased the lateral trend of exponential decay constants ($\alpha$) tends to be, the more abnormal the mucosa sample is.

In another embodiment, first, a mucosa sample is scanned with optical coherence tomography. The optical coherence tomography may comprise time domain optical coherence tomography, spectral-domain optical coherence tomography or swept-source optical coherence tomography. In one embodiment, the mucosa sample may comprise an oral mucosa sample.

Then, a specific lateral range from a two- or three-dimensional optical coherence tomography image is selected and all A-scan intensity signal profiles within the specific lateral range are analyzed. The specific lateral range may be about 0.001-100 mm. In one embodiment, the specific lateral range is about 2 mm. Finally, an epithelium thicknesses (T) of the mucosa sample for each of A-scan intensity signal profiles within the specific lateral range is calculated, respectively, and all the epithelium thicknesses (T) at all the A-scan intensity signal profiles within the specific lateral range are third-order polynomial fitted to obtain a lateral trend of all the epithelium thicknesses (T) at all the A-scan intensity signal profiles within the specific lateral range and the mucosa sample is analyzed with the lateral trend of all the epithelium thicknesses (T). The greater the lateral trend of the epithelium thicknesses (T) tend to be, the more abnormal the mucosa sample is.

The invention further provides a method for identifying a normal or abnormal mucosa sample with optical coherence tomography.

First, a normal mucosa sample and a suspected abnormal mucosa sample from an individual are provided. In one embodiment, the normal mucosa sample or the suspected abnormal mucosa sample may comprise an oral mucosa sample. Then, the normal mucosa sample and the suspected abnormal mucosa sample are scanned with optical coherence tomography, respectively. The optical coherence tomography may comprise time domain optical coherence tomography, spectral-domain optical coherence tomography or swept-source optical coherence tomography.

Next, according to a two-dimensional optical coherence tomography image, a specific lateral range from a surface of the normal mucosa sample and the suspected abnormal mucosa sample is selected, respectively, wherein the lengths of the specific lateral ranges from the surface of the normal mucosa sample and from the surface of the suspected abnormal mucosa sample are the same. The specific lateral range may be about 0.001-100 mm, preferably 2 mm. A standard deviation (SD), an exponential decay constants ($\alpha$) and an epithelium thicknesses (T) for each of the A-scan intensity signal profiles within the specific lateral range from the surface of the normal mucosa sample and from the surface of the suspected abnormal mucosa sample are calculated, respectively.

After, scanned results for the normal mucosa sample and the suspected abnormal mucosa sample are compared, respectively, wherein the standard deviations (SD), the exponential decay constants ($\alpha$) and the epithelium thicknesses (T) of the A-scan intensity signal profiles change with a position of the selected specific lateral range and then the means of all the standard deviations (SD), all the exponential decay constants ($\alpha$) and all the epithelium thicknesses (T) within the specific lateral range from the normal mucosa sample and from the suspected abnormal mucosa sample are obtained, respectively.

When the mean of all the standard deviation (SD) of the suspected abnormal mucosa sample is greater than the normal mucosa sample, the suspected abnormal mucosa sample is an abnormal sample. When the mean of all the exponential decay constants ($\alpha$) of the suspected abnormal mucosa sample is less than the normal mucosa sample, the suspected abnormal mucosa sample is an abnormal sample. Furthermore, when the mean of all the epithelium thicknesses (T) of the suspected abnormal mucosa sample is greater than the normal mucosa sample, the suspected abnormal mucosa sample is an abnormal sample under the condition that a boundary between an epithelium and a lamina propria of of the mucosa exists.

Example

Scanning Samples Form Patient with Oral Premalignant Lesions and Patient with Oral Cancer with SS-OCT System FIG. 1 shows a layout of a portable SS-OCT system used for clinical scanning. A sweeping-frequency laser source with an output spectral sweeping full width at half—maximum of 110 nm, centered at 1310 nm, was used as the light source. The light was output by the light source and through a Mach-Zehnder interferometer consisting of two fiber couplers and two circulators. A neutral density (ND) filter was used in the reference arm to maximize the system sensitivity. Finally, an interference fringe signal was detected by a balanced photo detector to transform the light signal into an electronic signal and be sampled by a high-speed digitizer. The achieved SS-OCT system sensitivity, axial resolution and lateral resolution were 103 dB, 8 μm and 15 μm, respectively. In addition, in the sample arm, the lateral scanning was implemented with a handheld probe consisting of a linear stepping motor, which was used to achieve a scanning speed of 10 cm/s. For clinical applications, the entire probe is wrapped by a plastic plate to protect the optical components inside the probe and for easy sterilization.

During the clinical study, the SS-OCT system was used to scan 32 patients, wherein the patients comprised 31 males and 1 female with age ranging from 30 through 77 years old. During each diagnosis, the probe, lightly contacted the position which was selected to be scanned. The position comprised of normal mucosa regions and abnormal mucosa regions, wherein the abnormal mucosa regions were overlapped with a biopsy specimen. Then, the biopsy specimen was taken from abnormal mucosa regions to make a comparison between the results from the SS-OCT scan and from biopsy specimen. Before analyzing the scanned results of the mucosa sample, the signal of the plastic plate was removed and then, according to a single A-scan intensity signal profile, a first maximum A-scan intensity signal and a second maximum A-scan intensity signal were obtained through software written by LabVIEW (National Instrument). The first maximum refers to the boundary between the air and the epithelium and the second maximum refers to the boundary between the epithelium and the lamina propria. By calculating the two maximums, the epithelium thickness (T) was obtained. The standard deviation (SD) for each A-scan intensity signal profiles were also obtained by calculating all A-mode scan signal intensities in a range from 100 through 250 μm in depth for each A-mode scan. For calculation of the exponential decay constant ($\alpha$), all A-scan intensity signals in each of the A-scan intensity signal profiles was Fourier transformed and then a result from the Fourier transforming operation was exponential decay fitted to obtain an exponential decay constant ($\alpha$).

Figure 2:
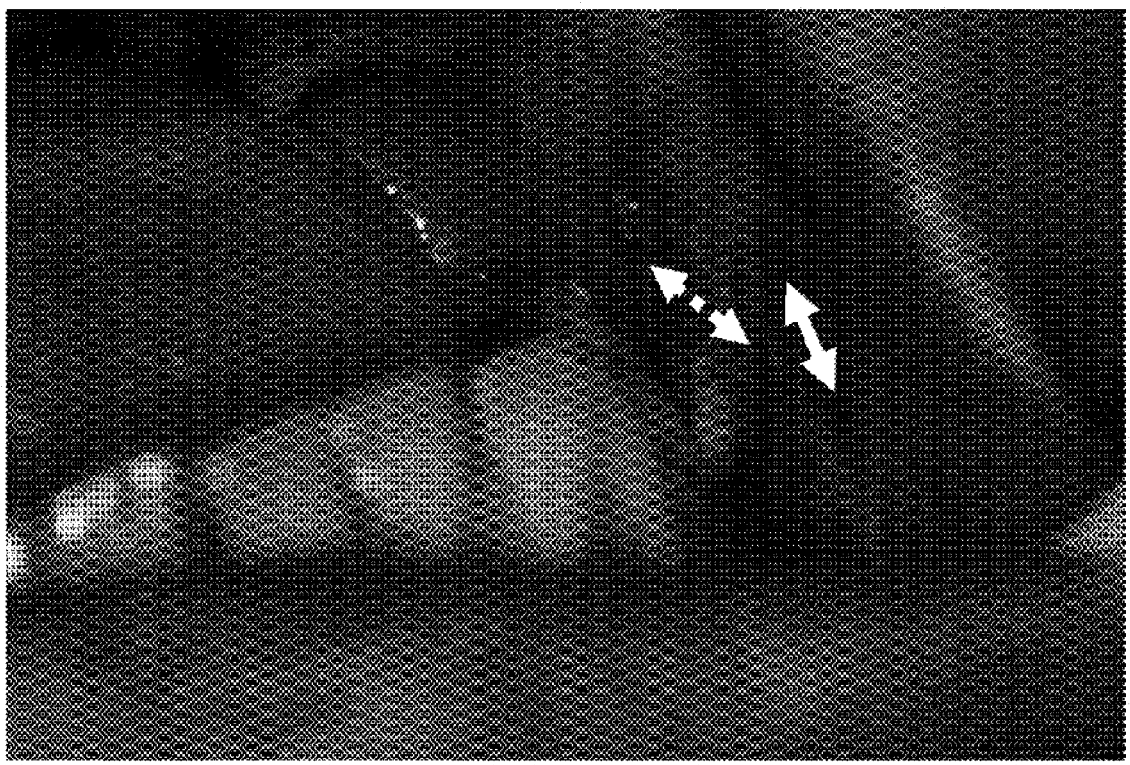
FIG. 2 shows a clinical photograph of an oral mucosal tissue with buccal SCC from a patient.
Figure 3A:
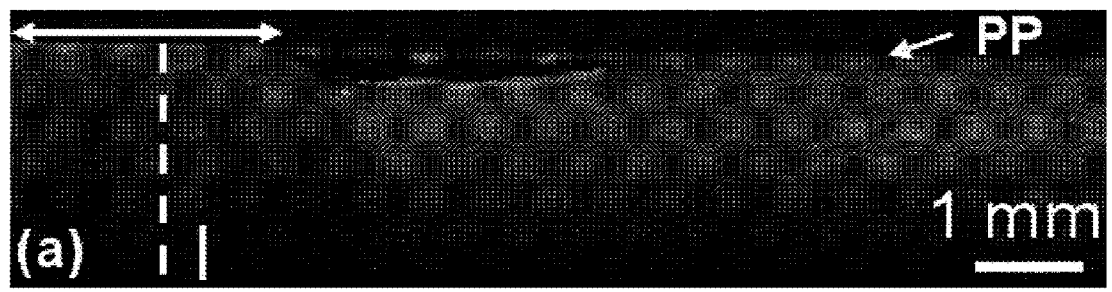
FIGS. 3(a) and (b) show the SS-OCT scanned images of the portions indicated by the dotted line and filled line in FIG. 2, respectively.
Figure 3B:
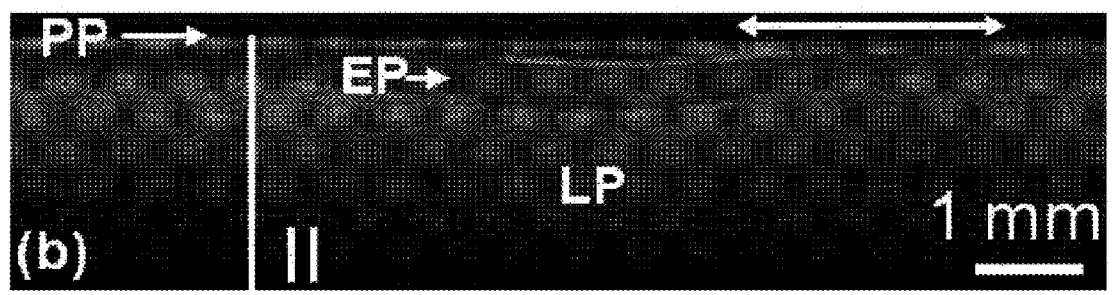
Figure 4:
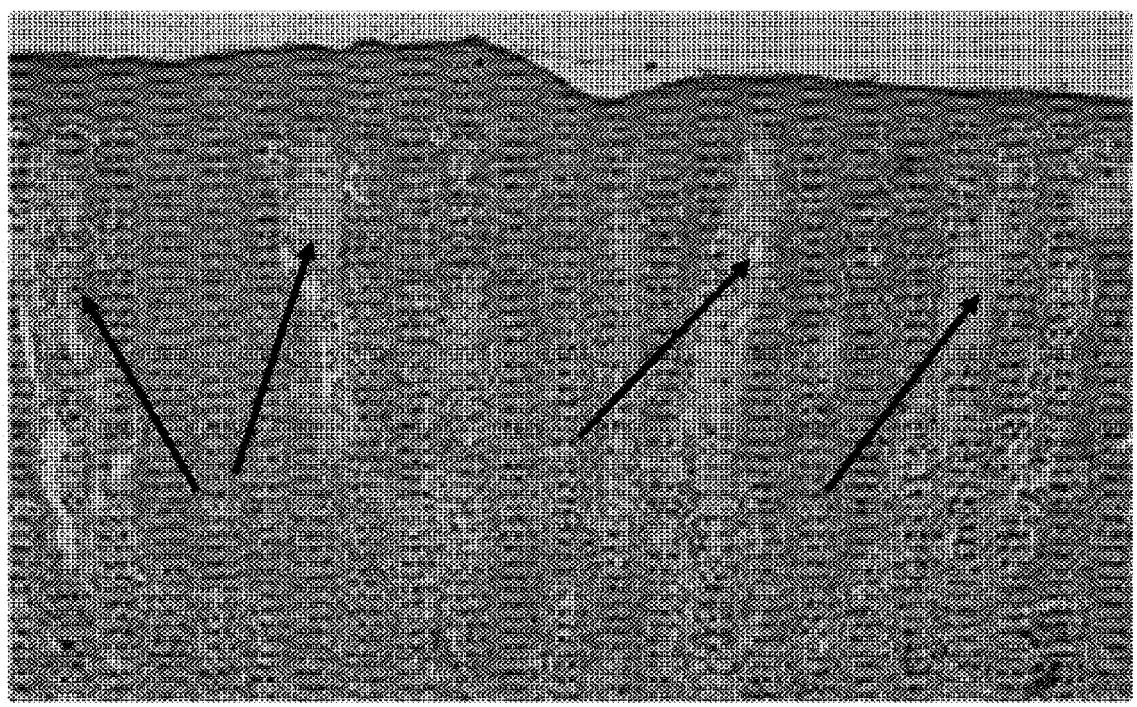
FIG. 4 shows the result of the biopsy specimen from the position at the dotted line in FIG. 2.

FIG. 2 shows a clinical photograph of an oral mucosal tissue with buccal SCC from a patient. The dotted line and filled line indicate SSOCT scan positions and the dotted line and filled line refer to the normal oral mucosal tissues and abnormal oral mucosal tissues, respectively. Furthermore, the biopsy specimen was taken from the location of the dotted line. FIGS. 3(a) and (b) show the SS-OCT scanned images of the portions indicated by the dotted line and filled line in FIG. 2, respectively. In the abnormal oral mucosal tissue, the boundary between EP and LP layers disappeared and the two way arrow in the FIGS. 3(a) and 3(b) indicate the regions which were selected to be analyzed. FIG. 4 shows the result of the biopsy specimen from the position at the dotted line in FIG. 2. The result of the biopsy specimen showed that the patient was in the early squamous cell carcinoma evolution stage. In histology, tissues with hyperkeratosis were observed and abnormal cells were also found, therefore the biopsy specimen was identified to be severe epithelium dysplasia. Moreover, connective tissue papillae in the epithelial ridge and the epithelial in the biopsy specimen were also observed in the left one-third portion of FIG. 3(a).

Figure 5A:
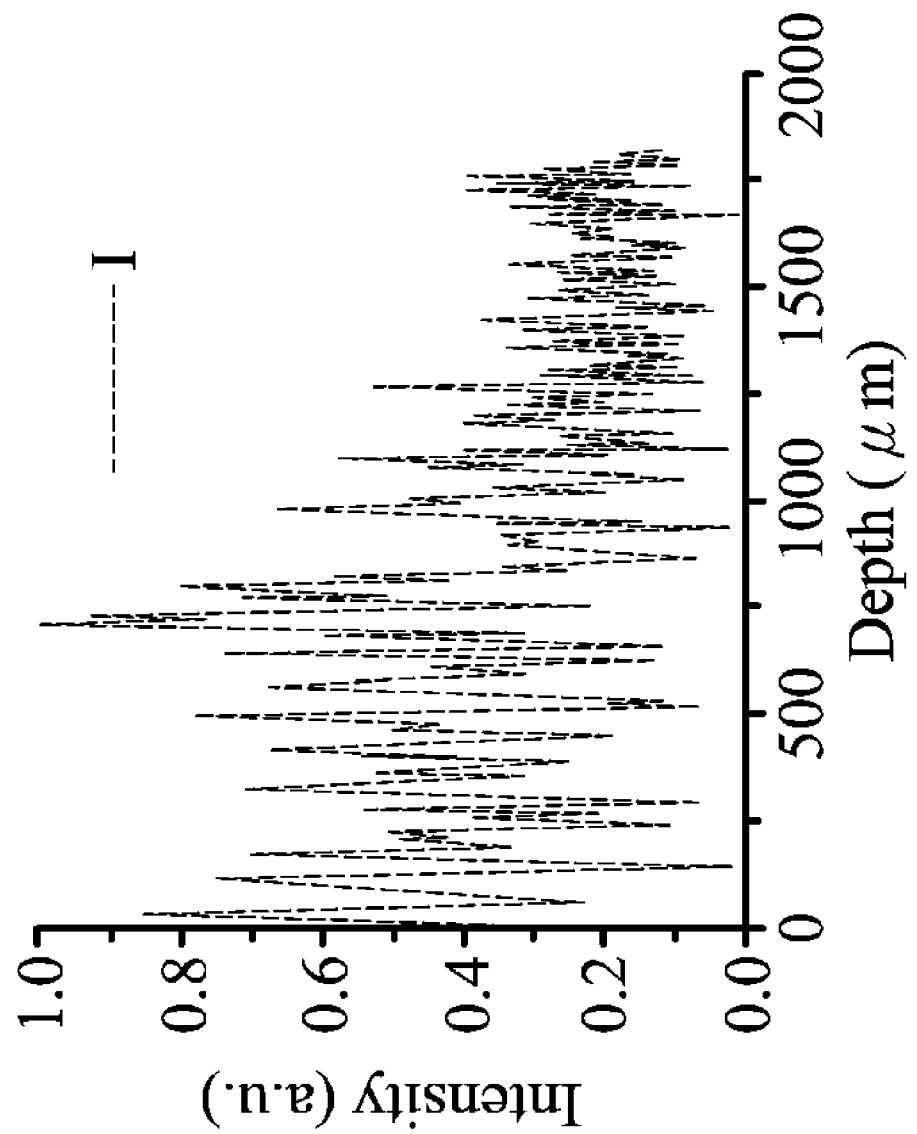
FIGS. 5(a) and (b) show the A-mode scan profiles of the dotted line I (abnormal oral mucosa) and filled line II (normal oral mucosa) in FIGS. 3(a) and (b)
Figure 5B:
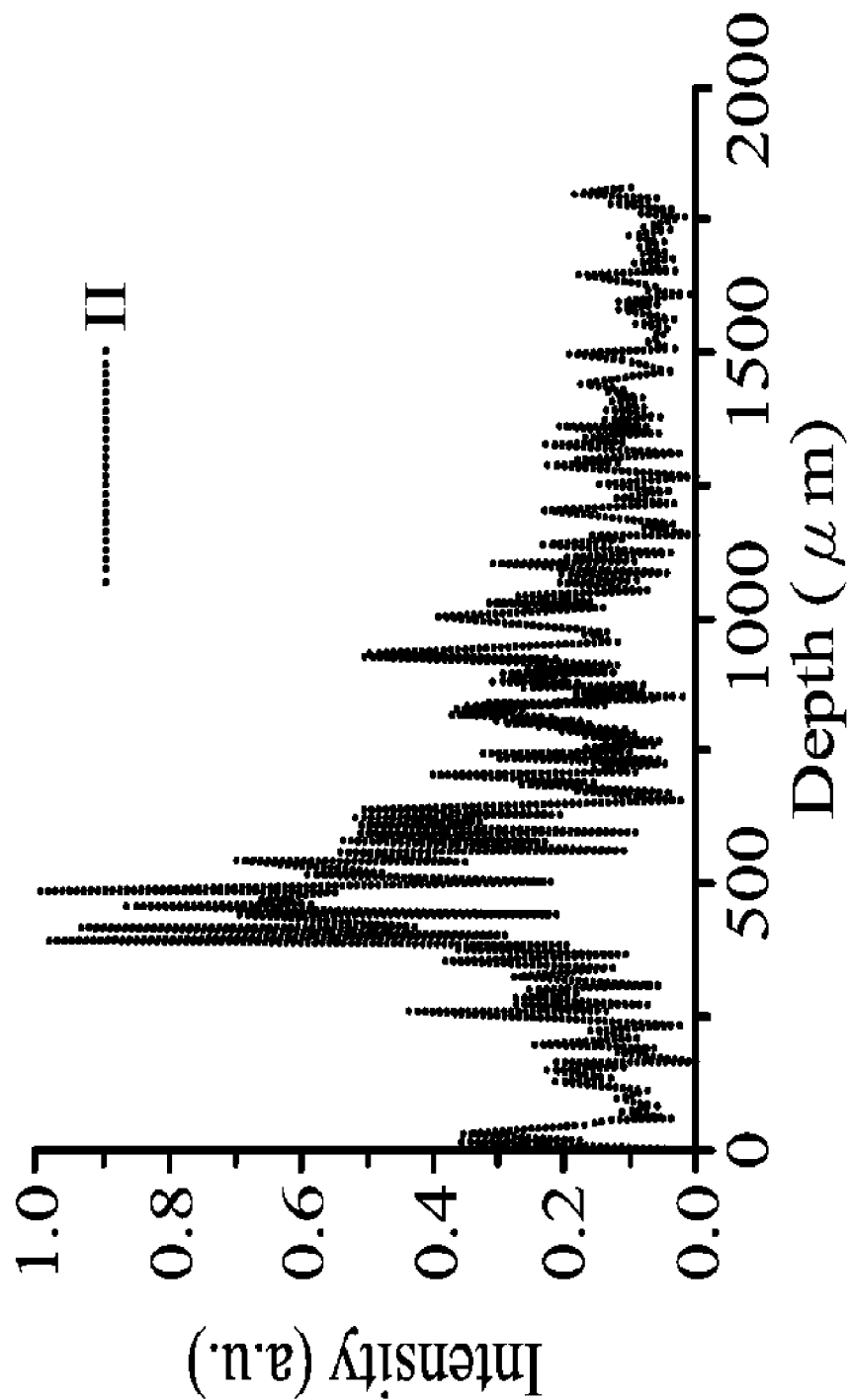
FIGS. 5(c) and (d) show the spatial frequency signals, which are obtained by Fourier transforming the profiles in FIGS. 5(a) and (b), respectively.
Figure 5C:
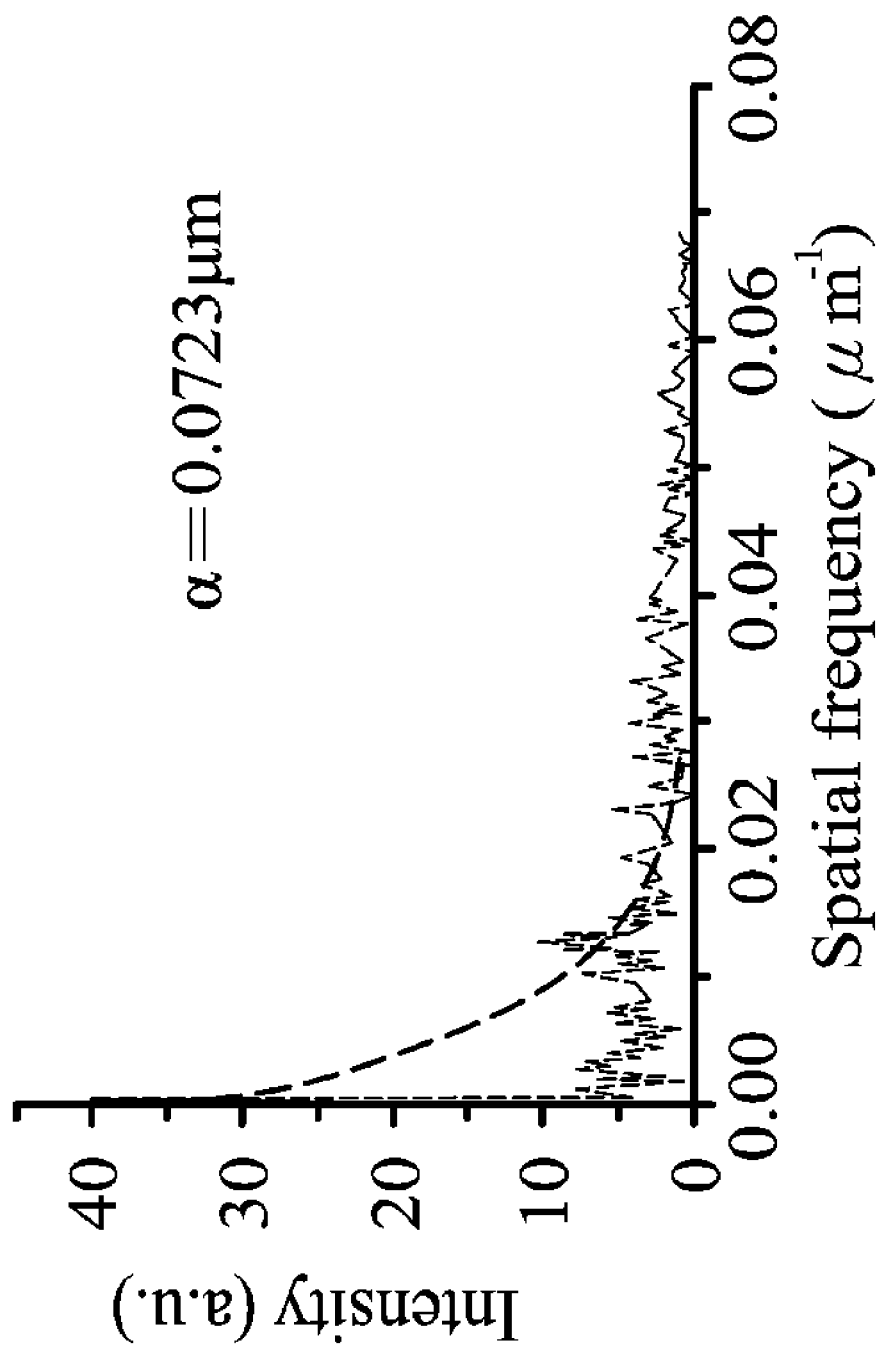
Figure 5D:
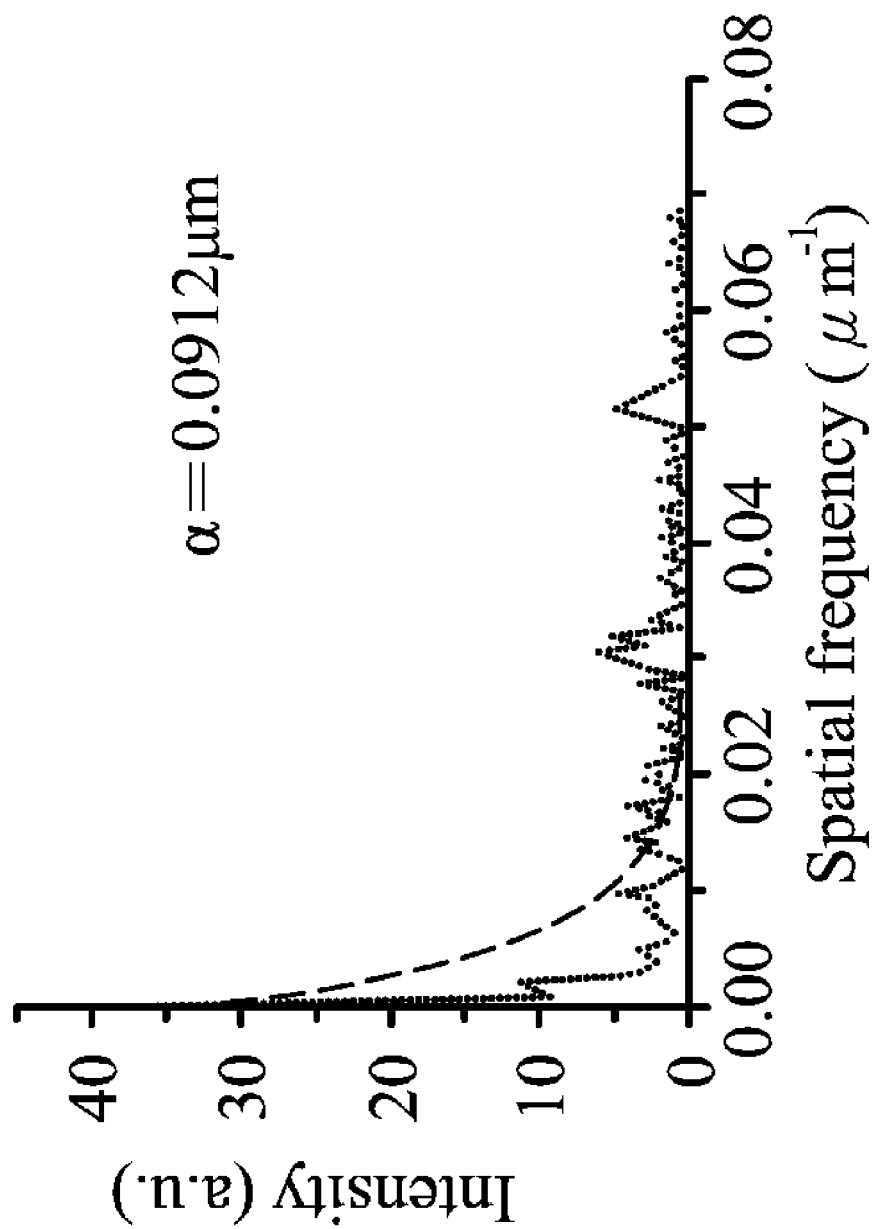

FIGS. 5(a) and (b) show the A-mode scan profiles of the dotted line and filled line in FIGS. 3(a) and (b), respectively. In FIG. 5(b), sharp spikes between 400 and 500 μm in depth were observed, corresponding to the boundary between EP and LP layers. However, in the cancerous tissue of FIG. 5(a) a peak of around 700 μm was observed due to the residual boundary after the EP layer thickened during the early oral cancer evolution stage. An important feature in the comparison between FIGS. 5(a) and (b) was that the signal intensity fluctuation in the abnormal tissue was stronger than the normal tissue. Thus, the standard deviation, SD, of such fluctuations can be used to express the feature and can be used as one of the diagnosis indicators. Due to the fact that the arrangement of abnormal mucosa cells was not homogeneous, the scanned results showed greater fluctuations for the A-scan. Also, the A-scan intensity signal profile of the abnormal mucosa had a stronger low-spatial-frequency signal. Comparing FIGS. 5(c) and (d), which were obtained by Fourier transforming the profiles in FIGS. 5(a) and (b), respectively, the A-scan intensity signal profile in the abnormal mucosa had a stronger low-spatial-frequency signal. To quantify this feature, first, 50 data points of spatial frequency at the low-frequency end were fitted with an exponential decay curve to obtain a decay constant, $\alpha$. In the abnormal mucosa, due to the stronger low-spatial-frequency signal, the decay of the exponential curve slowed and the exponential decay constant ($\alpha$) obtained through fitting was less than that for normal mucosa. The $\alpha$ values of in FIGS. 5(c) and (d) were 0.0723 μm and 0.0912 μm, respectively. Therefore, the $\alpha$ value analysis for the normal mucosa and for the abnormal mucosa showed significant difference.

Figure 6A:
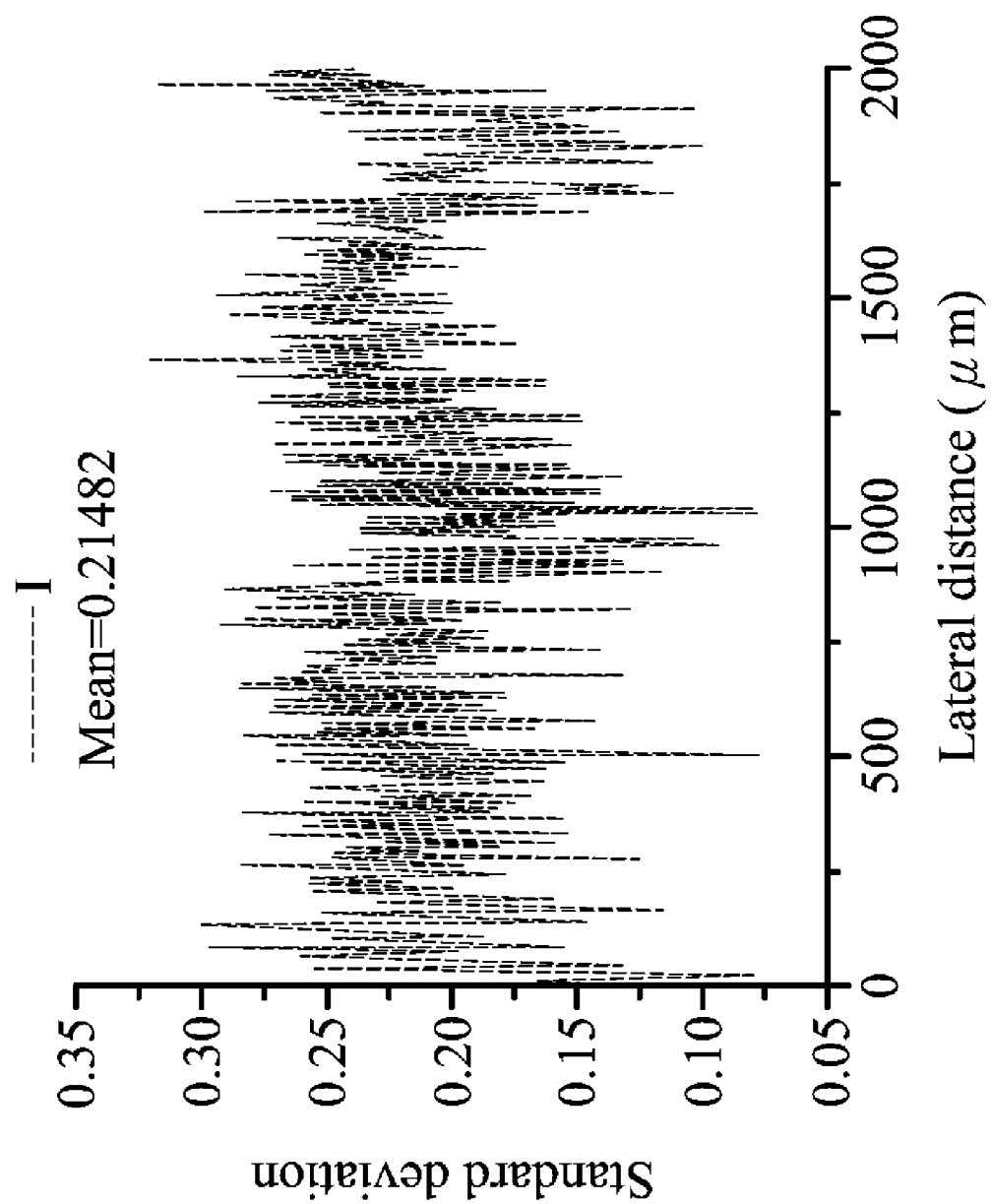
FIGS. 6(a) and (b) show the evaluated SD values with the ranges indicated by the two way arrows in FIGS. 3(a) and (b), respectively.
Figure 6B:
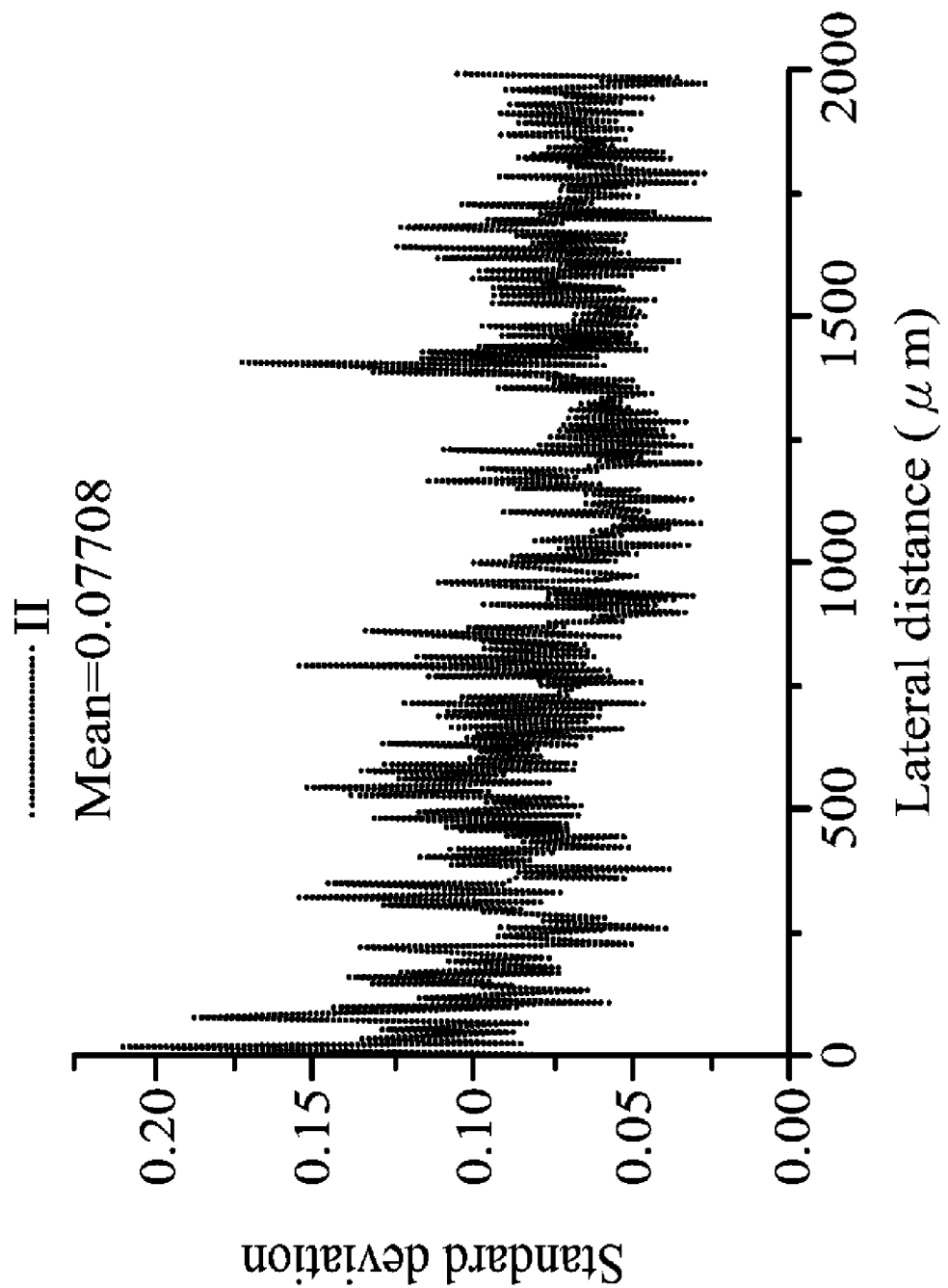
Figure 7A:
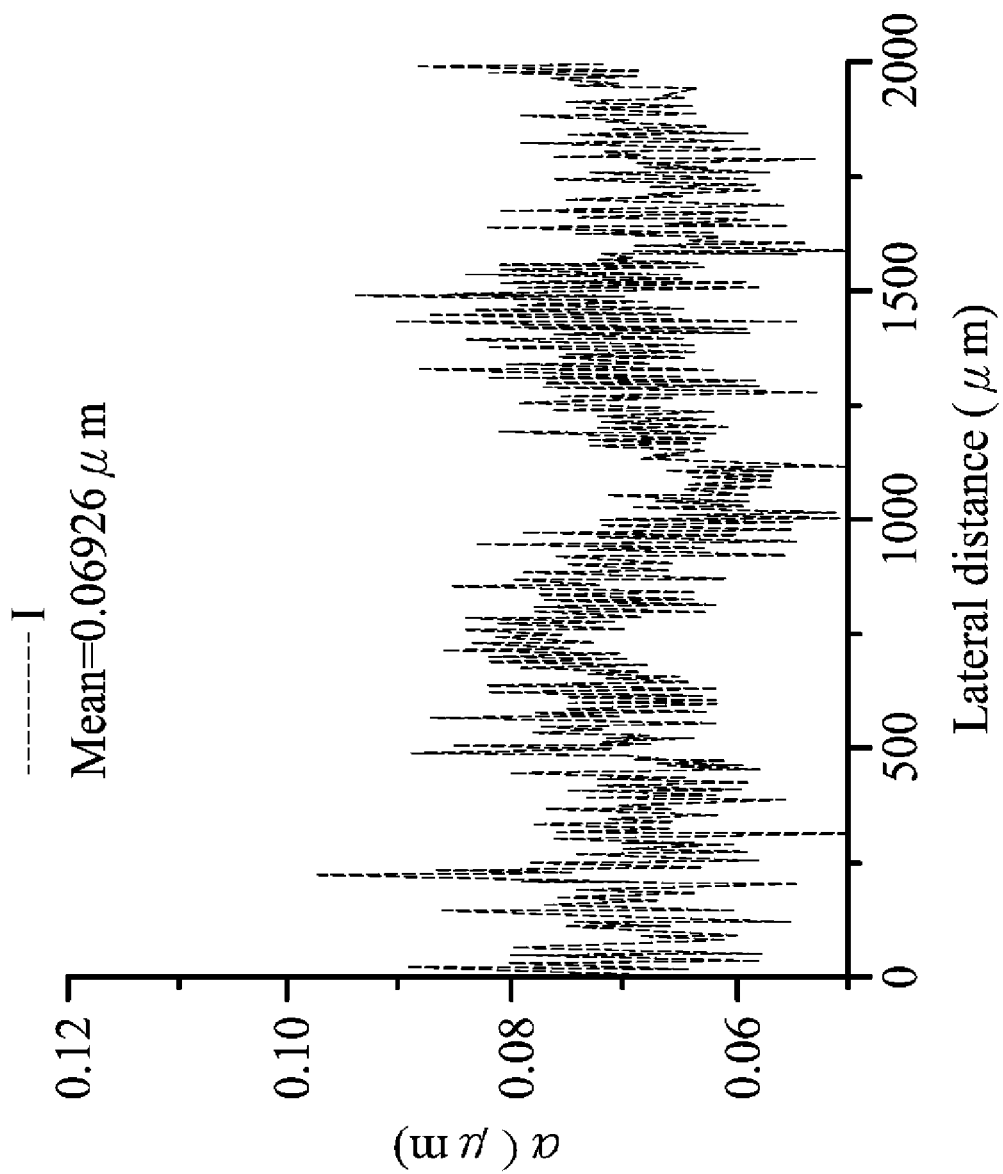
FIGS. 7(a) and (b) show the evaluated $\alpha$ values within the ranges indicated by the horizontal white arrows in FIGS. 3(a) and (b), respectively.
Figure 7B:
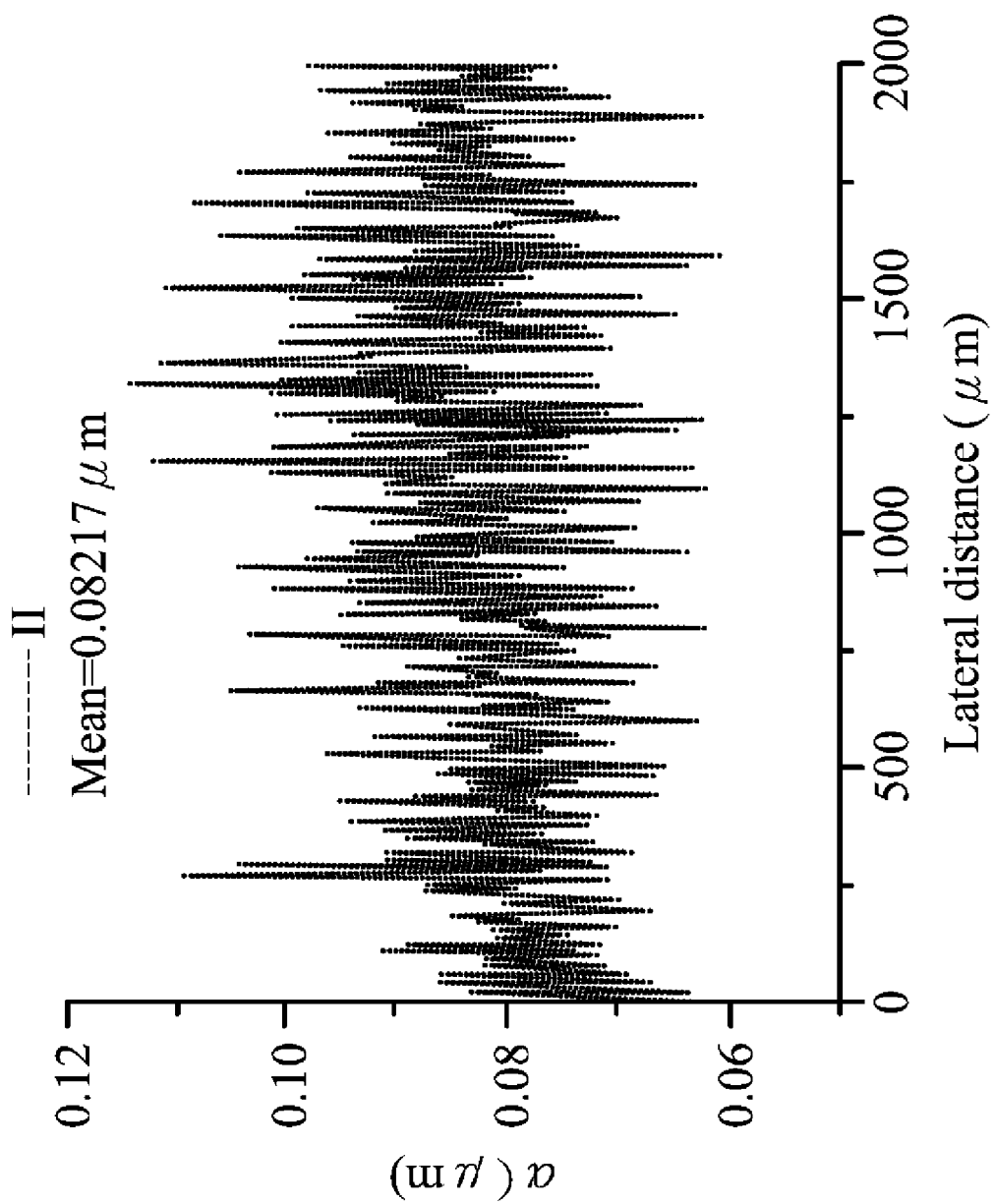

FIGS. 6(a) and (b) show the evaluated SD values with ranges indicated by the two way arrows in FIGS. 3(a) and (b), respectively. Although fluctuation exists for the SD value, its relative level when comparing FIGS. 6(a) and (b) showed that a significant differences existed between the abnormal and normal oral mucosa tissues (0.21482 for the abnormal tissue versus 0.07708 for normal oral mucosa). Similar results were also found in the $\alpha$ value analysis. FIGS. 7(a) and (b) show the evaluated $\alpha$ values within the ranges indicated by the horizontal white arrows in FIGS. 3(a) and (b), respectively. FIGS. 7(a) and (b) show a significant difference between the abnormal and normal oral mucosa tissues (0.06926 μm for the cancerous tissue versus 0.08217 μm for the normal oral mucosa), which indicated that the abnormal oral mucosa tissue had stronger low-spatial-frequency signal versus the normal oral mucosa.

Figure 8A:
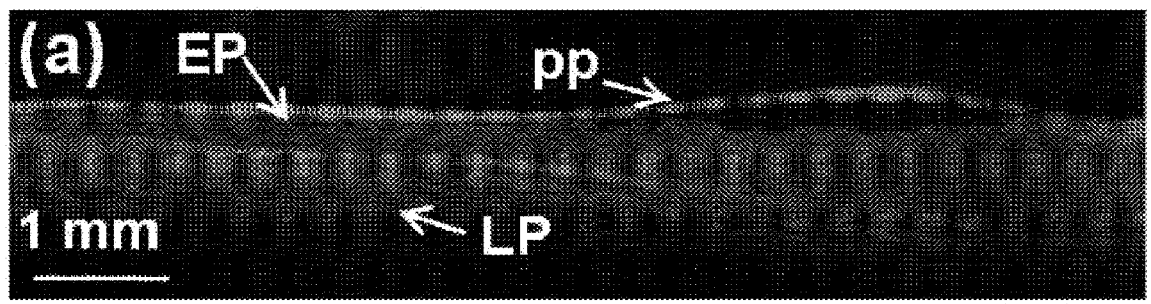
FIG. 8(a) shows an SS-OCT image of an EH lesion of a patient.
Figure 8B:
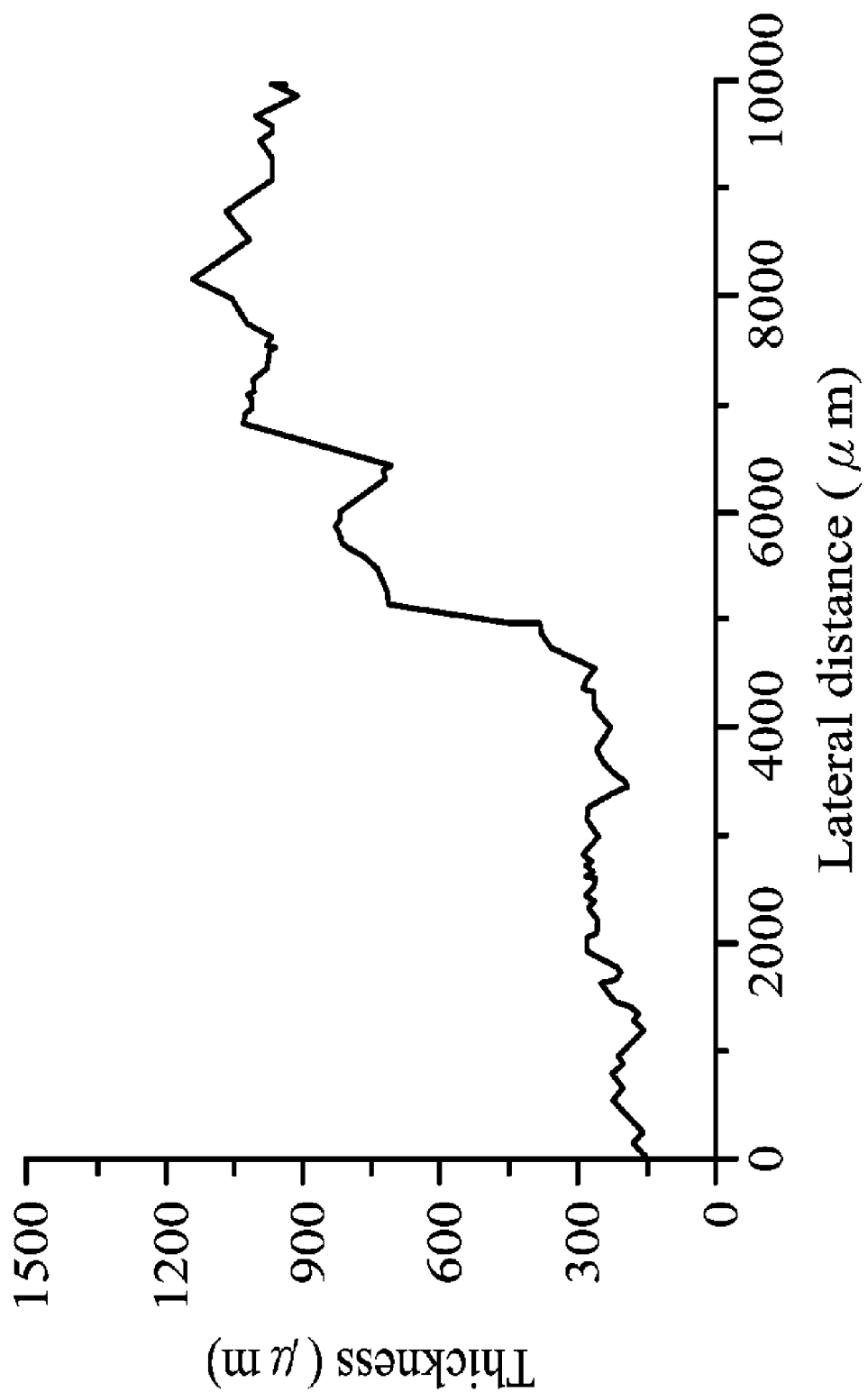
FIG. 8(b) shows the lateral changing trend for epithelium thicknesses (T) of FIG. 8(a).

In the early stage of oral cancer, abnormal cells start accumulating in the EP layer and then invade to the lamina propria. For oral mucosa with epithelial hyperplastic lesions, the EP layer usually is thicker when compared to a normal mucosa. Therefore, except for the SD and $\alpha$ value, before the boundary disappears, the EP thickness, which is defined as T, is another good indicator for diagnosis. FIG. 8(a) shows an SS-OCT image of an EH lesion of a patient, wherein the scanned region is from a normal region to an abnormal region. FIG. 8(a) shows that epithelium thickness (T) increases from the left side to the right side. The epithelium thicknesses (T) were calculated by using LabVIEW, and FIG. 8(b) shows the epithelium thicknesses (T) of the entire scanning range. In the left one-half of FIG. 8(a) the epithelium thicknesses (T) were always smaller than 300 μm, beyond 5 mm for lateral distances, increasing up to 1.2 mm. Therefore, the epithelium thickness (T) may be used as good indicator for diagnosis.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for identifying a normal or abnormal mucosa sample with optical coherence tomography, comprising:
    (a) providing a normal mucosa sample and a suspected abnormal mucosa sample from an individual;
    (b) scanning the normal mucosa sample and the suspected abnormal mucosa sample with optical coherence tomography, respectively;
    (c) according to a two-dimensional optical coherence tomography image, selecting a specific lateral range from a surface of the normal mucosa sample and the suspected abnormal mucosa sample, respectively, wherein the lengths of the specific lateral ranges from the surface of the normal mucosa sample and from the surface of the suspected abnormal mucosa sample are the same;
    (d) calculating a standard deviation (SD), an exponential decay constants ($\alpha$) and an epithelium thicknesses (T) for each of A-scan intensity signal profiles within the specific lateral range from the surface of the normal mucosa sample and from the surface of the suspected abnormal mucosa sample, respectively;
    (e) comparing scanned results for the normal mucosa sample and the suspected abnormal mucosa sample, respectively, wherein the standard deviation (SD), the exponential decay constants ($\alpha$) and the epithelium thicknesses (T) of the A-scan intensity signal profile changes with a position of the selected specific lateral range, and then obtaining the means of all the standard deviation (SD), all the exponential decay constants ($\alpha$) and all the epithelium thicknesses (T) within the specific lateral range from the normal mucosa sample and from the suspected abnormal mucosa sample, respectively;
    (f) comparing the means of all the standard deviation (SD), all the exponential decay constants ($\alpha$) and all the epithelium thicknesses (T) within the specific lateral range from the normal mucosa sample and from the suspected abnormal mucosa sample, respectively; and
    (g) the suspected abnormal mucosa sample being an abnormal sample when the mean of all the standard deviations (SD) of the suspected abnormal mucosa sample is greater than the normal mucosa sample, the suspected abnormal mucosa sample being an abnormal sample when the mean of all the exponential decay constants ($\alpha$) of the suspected abnormal mucosa sample is less than the normal mucosa sample, and the suspected abnormal mucosa sample being an abnormal sample when the mean of all the epithelium thicknesses (T) of the suspected abnormal mucosa sample is greater than the normal mucosa sample under the condition that a boundary between an epithelium and a lamina propria of the of the mucosa sample exists.

2. The method for identifying a normal or abnormal mucosa sample with optical coherence tomography as claimed in claim 1, wherein the normal mucosa sample or the suspected abnormal mucosa sample comprises an oral mucosa sample.

3. The method for identifying a normal or abnormal mucosa sample with optical coherence tomography as claimed in claim 1, wherein the optical coherence tomography comprises time domain optical coherence tomography, spectral-domain optical coherence tomography or swept-source optical coherence tomography.

4. The method for identifying a normal or abnormal mucosa sample with optical coherence tomography as claimed in claim 1, wherein the specific lateral range is about 0.001-100 mm.

* * * * *